(12) United States Patent
Huang et al.

(10) Patent No.: US 8,539,200 B2
(45) Date of Patent: Sep. 17, 2013

(54) OS-MEDIATED LAUNCH OF OS-INDEPENDENT APPLICATION

(75) Inventors: David H. Huang, Shanghai (CN); Xin Li, Shanghai (CN); Ruth Li, Shanghai (CN); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 920 days.

(21) Appl. No.: 12/108,136

(22) Filed: Apr. 23, 2008

(65) Prior Publication Data

US 2009/0327679 A1    Dec. 31, 2009

(51) Int. Cl.
*G06F 9/00* (2006.01)
*G06F 15/177* (2006.01)

(52) U.S. Cl.
USPC .................... 712/2; 713/1; 714/2; 714/15

(58) Field of Classification Search
USPC ........................... 713/1, 2; 714/2, 15
See application file for complete search history.

(56) References Cited

U.S. PATENT DOCUMENTS

| | | | |
|---|---|---|---|
| 6,279,120 B1 * | 8/2001 | Lautenbach-Lampe et al. | 714/15 |
| 6,948,094 B2 * | 9/2005 | Schultz et al. | 714/15 |
| 7,117,396 B2 * | 10/2006 | Komarla et al. | 714/45 |
| 7,308,609 B2 * | 12/2007 | Dickenson et al. | 714/36 |
| 7,603,440 B1 * | 10/2009 | Grabowski et al. | 709/220 |
| 7,634,685 B2 * | 12/2009 | Henrickson | 714/6.11 |
| 7,788,537 B1 * | 8/2010 | Yellen et al. | 714/38.11 |
| 7,900,033 B2 * | 3/2011 | Rothman et al. | 713/2 |
| 8,224,784 B2 * | 7/2012 | Henrickson | 707/654 |
| 2003/0126516 A1 * | 7/2003 | Komarla et al. | 714/45 |
| 2005/0216759 A1 | 9/2005 | Rothman et al. | |
| 2005/0240826 A1 * | 10/2005 | Dickenson et al. | 714/42 |
| 2007/0061634 A1 * | 3/2007 | Marisetty et al. | 714/48 |
| 2008/0046877 A1 * | 2/2008 | Ford | 717/168 |
| 2009/0006827 A1 * | 1/2009 | Rothman et al. | 713/1 |
| 2009/0217378 A1 * | 8/2009 | Johnson et al. | 726/23 |
| 2009/0282486 A1 | 11/2009 | Zimmer et al. | |

OTHER PUBLICATIONS

Unified Extensible Firmware Interface Specification, Version 2.1 Jan. 23, 2007.
Intel® Platform Innovation Framework for EFI Capsule Specification, Draft for Review, Version 0.9, Sep. 16, 2003.
Intel® Platform Innovation Framework for EFI, http://www.intel.com/technology/framework/overview1.htm printed out on Apr. 7, 2008.
Zimmer, Vincent, et al., Beyond BIOS: Implementing the Unified Extensible Firmware Interface with Intel's Framework, chapter 8, Copyright date 2006, 25 pages.

* cited by examiner

*Primary Examiner* — Jaweed A Abbaszadeh
(74) *Attorney, Agent, or Firm* — Hanley, Flight & Zimmerman, LLC.

(57) ABSTRACT

A system, method, and computer readable medium for an operating system (OS) mediated launch of an OS dependent application is disclosed. An application running within an OS may operate outside an OS environment by constructing for example a capsule file, passing the capsule file to firmware interface, and restarting the system. The firmware interface may load various drivers and applications contained within the capsule file and execute them to perform a task. Upon completion of the task, the OS is booted again and the original application may resume control, making use of any information stored by the firmware interface in a dedicated status table or file. Other embodiments may be employed, and other embodiments are described and claimed.

15 Claims, 4 Drawing Sheets

OS-MEDIATED LAUNCH OF OS-INDEPENDENT APPLICATION

BACKGROUND OF THE INVENTION

In modern computing systems, most applications require an operating system (OS) to execute. In recent years, even applications such as anti-virus utilities, disk defragmentation utilities, undelete utilities, data recovery utilities, hardware diagnostic utilities, and other hardware repair utilities are usually executed within an OS environment, even if they perform such tasks traditionally thought of as "low level", e.g. operating on or near the hardware level, usually unmediated by an interface.

It is necessary or desirable to execute some applications outside an OS environment. One such example occurs when the OS itself becomes infected with a virus. In such a case, an anti-virus program generally cannot remove the virus and repair the system without endangering system stability or corrupting the OS files. This is especially true if the infected files are crucial to the operation of the OS, or if the infected files are currently resident in main memory.

If a user is confronted with such an error, her only option may be to restart the system and boot the system from an external source, such as a removable disk, and attempt to correct the problem. Usually, these removable disks contain a second OS of only minimal functionality, and often do not contain the very utility needed to fix the problem. Furthermore, a program that detects a problem while running in an OS environment may not directly pass information to a utility running from a boot disk or similar device. Thus, the boot disk may have to initiate the error detection and recovery processes from scratch, wasting valuable time.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features, and advantages thereof, may be best understood by reference to the following detailed description when read with the accompanied drawings in which:

DETAILED DESCRIPTION

Figure 1:
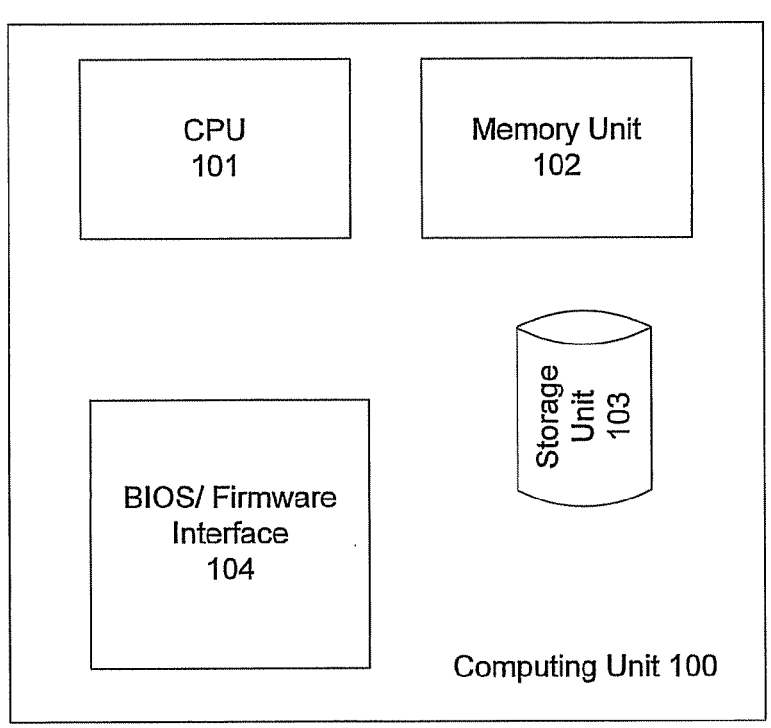
FIG. 1 illustrates a block diagram of a system for use with one embodiment of the present invention.

In the following detailed description, numerous specific details are set forth in order to provide a thorough understanding of the application. However it will be understood by those of ordinary skill in the art that embodiments of the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer, processor, or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that embodiments of the present invention may be used in a variety of applications. Although not limiting, the circuits and techniques disclosed herein may be used in many apparatuses such as personal computers, network equipment, stations of a radio system, wireless communication system, digital communication system, satellite communication system, and the like.

Computing devices intended to be included within the scope of embodiments of the present invention include, by way of example only, local area network (LAN) stations and/or nodes, metropolitan area network (MAN) stations and/or nodes, personal computers, workstations, portable computing devices, peripheral devices, wireless LAN stations, and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a personal area network (PAN), LAN, wide area network (WAN), or a global communication network, for example, the Internet.

Embodiments of the invention may include a computer readable medium, such as for example a memory, a disk drive, or a removable flash memory device, including instructions which when executed by a processor or controller, carry out methods disclosed herein.

Embodiments of the present invention may include an OS mediated launch of an OS dependent application. An application running within an OS may operate outside an OS environment by constructing a capsule file or other suitable file or software file, passing the capsule file to firmware interface, and restarting the system. The capsule may be a file or piece of software which contains for example applications, drivers, software, and other information necessary to perform a certain task outside an OS environment. The firmware interface may load various drivers and applications contained within the capsule file and execute them to perform a task. Upon completion of the task, the OS may be booted again and the original application may resume control, making use of any information stored by the firmware interface in a dedicated status table or file.

In FIG. 1, a block diagram of Computing Unit 100, which may be used with embodiments of present invention, is depicted. Central Processing Unit (CPU) 101 may comprise a standard processor capable of carrying out computer executable instructions. Memory Unit 102 preferably comprises such volatile memory types as Random Access Memory (RAM), but may also comprise non-volatile memory such as flash memory or Read Only Memory (ROM), without departing from the scope of the present invention. Storage unit 103 may include the main data storage apparatus for computing unit 100 and may employ such non-volatile storage types as hard disks, flash memory, optical disks, Solid State Drives (SSDs), and the like. Typically, an OS may be primarily stored on storage unit 103. However, it is to be understood by one of ordinary skill in the art of computer design that the OS may be at least partially or temporarily stored in memory unit 102, or that memory unit 102 and storage unit 103 may be combined into a single unit of either readable or read only memory (ROM). Basic Input-Output System (BIOS)/firmware interface 104 may be implemented in hardware, software, or a combination of both, and may act as an interface between the OS and firmware embedded in individual hardware components. The hierarchy of this relationship is depicted in FIG. 2.

Figure 2:
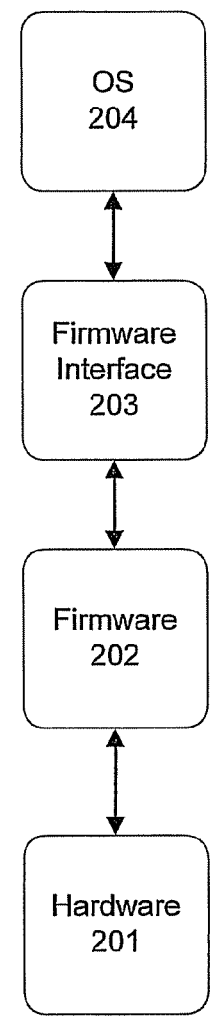
FIG. 2 illustrates a relationship of computer hardware and software used to explain various concepts of certain embodiments of the present invention.

FIG. 2 illustrates the software/hardware relationship used in computing devices capable of employing at least one embodiment of present invention. Starting from the lowest level, e.g. the level of abstraction closest to the physical transformations that occur in a computing device, hardware level 201 may include the functionality of such devices as CPU 101, memory unit 102, storage unit 103, and other peripherals such as Input Output (I/O) devices and system buses. Firmware 202 may comprise a computer program that is embedded in a hardware device of hardware level 210 and may run code to control such devices. Firmware 202 can also be provided on flash ROMs or as a binary image file that can be uploaded onto existing hardware by a user. As its name suggests, firmware 202 is generally considered somewhere between hardware and software. Like software, firmware 202 may be implemented as a computer program which is executed by a microprocessor or a microcontroller. But it may also be tightly linked to the devices of hardware level 201, and may have little meaning outside of it. One skilled in the computer arts should readily understand that the BIOS, which generally controls such functions as Power On Self Test (POST) and other booting processes, may also be considered as part of Firmware 202.

Firmware interface 203 may allow OS 204 to interact with hardware level 201 by means of firmware 202. It may also load hardware device drivers and applications that perform various computing and maintenance tasks outside of an OS environment. Preferably, firmware interface 203 may be implemented as a series of Application Programming Interfaces (APIs) accessible to OS 204 and initialized by an element of firmware 202, such as a BIOS. Alternatively, firmware interface 203 may be embedded in a hardware device such as an Erasable Programmable Read Only Memory (EPROM). Embodiments of the present invention may employ such standard firmware interfaces as Unified Extensible Firmware Interface (UEFI), but may also employ other standard interfaces known to one skilled in the computer arts. Alternatively, embodiments of the present invention may also function without firmware interface 203, and may employ a specially customized firmware 202, such as a BIOS.

OS 204 may provide an environment in which a user may run applications and may also manage system resources such as system hardware and data files. Generally, most applications, including system diagnostics and repair applications, operate within the OS environment. However, because the OS is generally considered to be high level, or relatively far removed from the hardware level, some computer repair utilities may be unable to function properly and may require more direct access to the system hardware.

Figure 3:
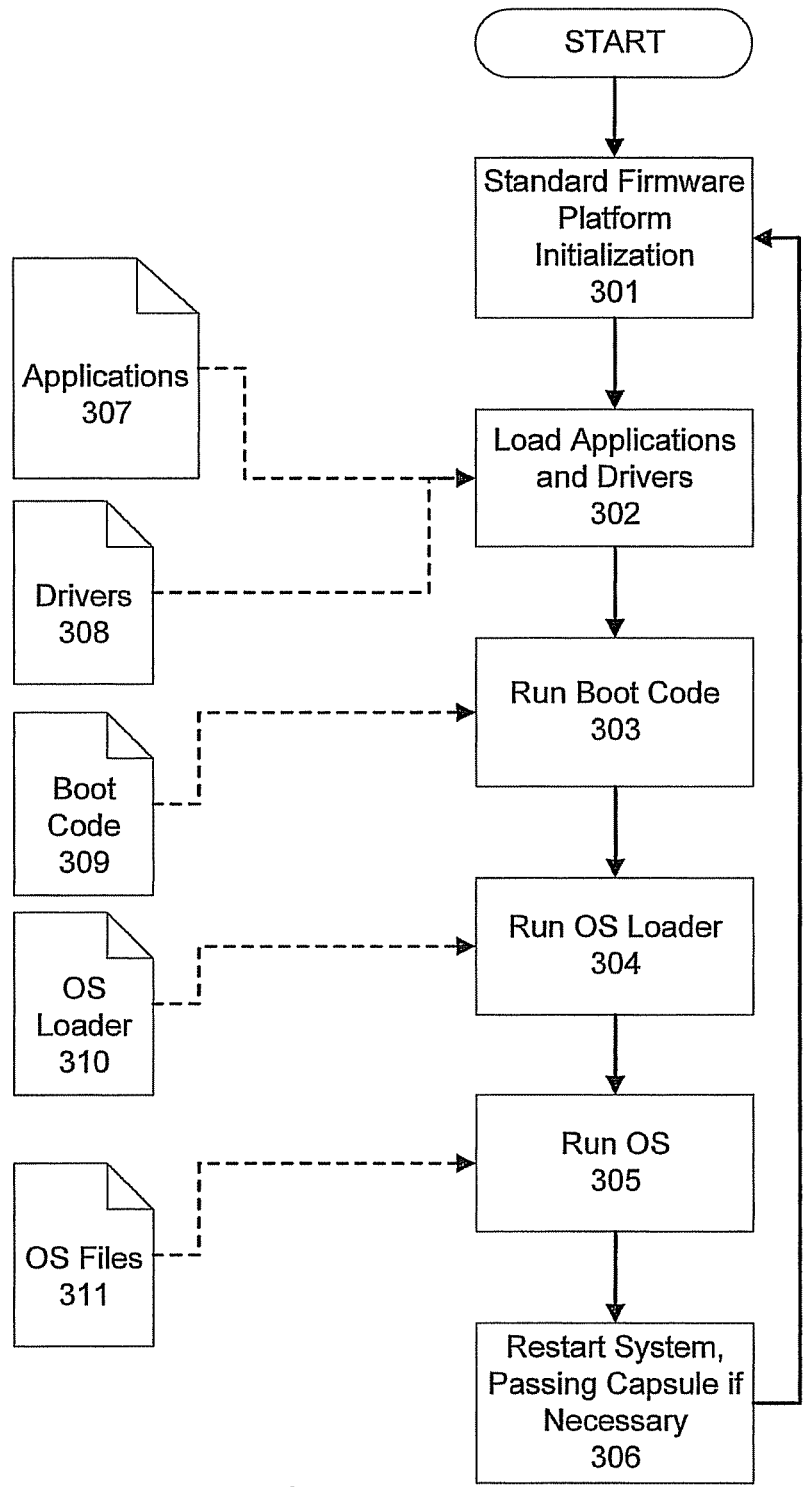
FIG. 3 is a flowchart of a booting process of a computer, according to one embodiment of the present invention.

FIG. 3 is a flowchart of a boot up process of a computing device capable of allowing certain applications to execute outside of an OS environment, according to an embodiment of the present invention. In operation 301, the various components that make up the system hardware may engage their initialization routines, if necessary. These routines may include such things as POST or memory initialization. Generally, these routines are unique to the individual type and specific model of each hardware component, and are generally only modifiable through a firmware upgrade provided by the component's manufacturer. After initialization, the system may then proceed to load modules such as for example applications 307 and drivers 308 in operation 302. These applications may be free to operate outside the OS environment and may interact with relevant hardware components using, for example, drivers loaded by the system.

In operation 303, the system may load boot code 309, which may manage the various input sources from which an OS may be loaded. Boot code 309 may keep an ordered list of sources from which an OS may be loaded (including for example internal and external data storage units, drive partitions, and network accessible sources) as well as an ordered list of operating systems, if multiple such operating systems are available. From this list, boot code 309 may select an OS to load, either automatically, or per manual user input.

In operation 304, the system may execute OS loader 310, which begins the process of booting the OS onto the system. OS loader 310 may contain files specific to each OS necessary to begin the process of loading the OS.

In operation 305, the system may load the remaining OS files 311 to complete the OS boot up process. The OS may be booted. From this point, the system may freely execute applications, including for example anti-virus utilities, disk defragmentation utilities, undelete utilities, data recovery utilities, and other hardware diagnostic and repair utilities. Should the system encounter an error during the execution of these types of utilities which may best be handled outside the OS environment, the system may choose to restart the system in operation 306, after passing a capsule to an interface such as for example firmware interface 203. The capsule may be a file which contains for example applications, drivers, software, and other information necessary to perform a certain task outside an OS environment. Other such executable or other files may also be employed. A capsule passing process is discussed in connection with FIG. 4.

Other operations or series or operations may be used.

Figure 4:
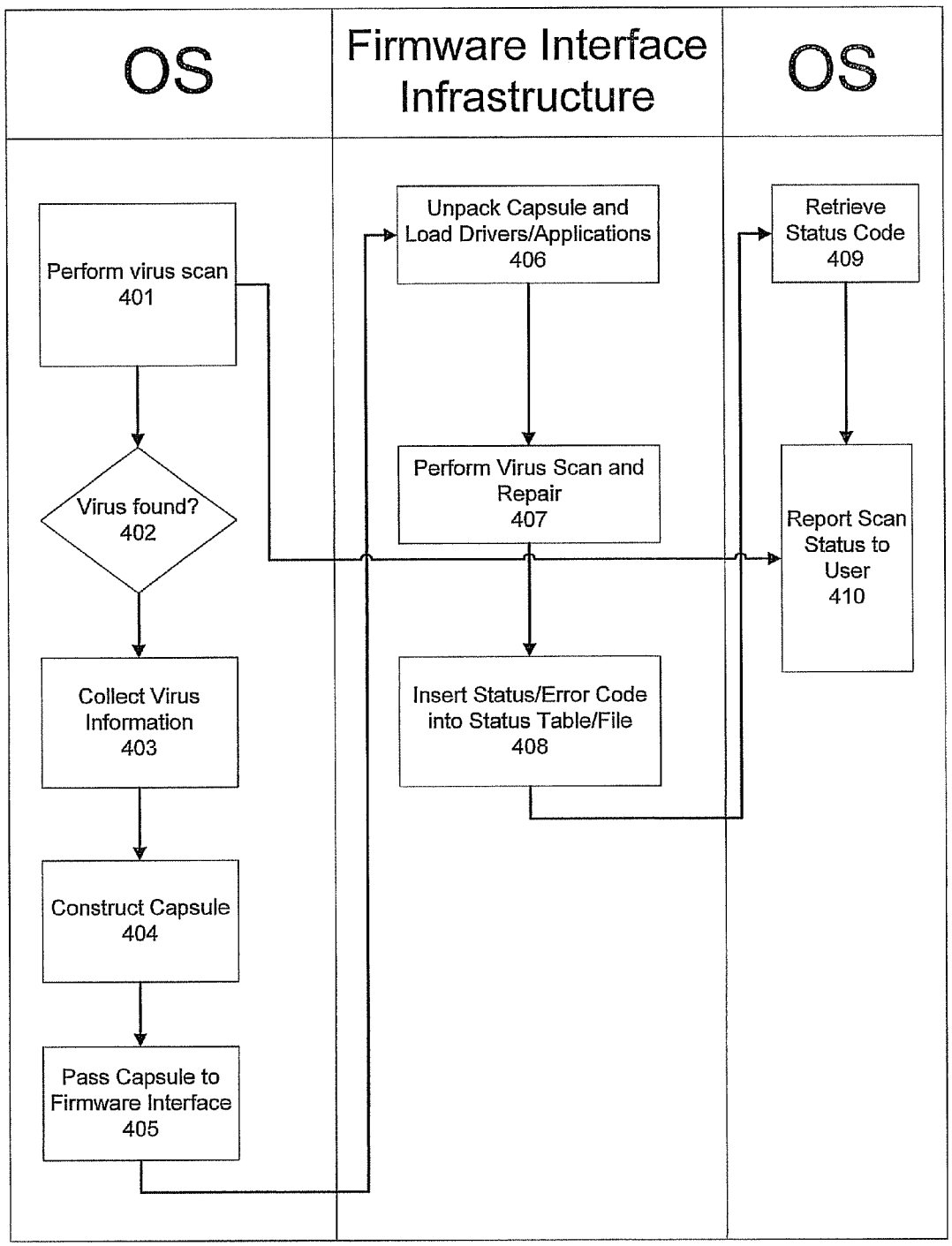
FIG. 4 is a flowchart of the process by which a system handles errors both within and outside an OS environment, according to one embodiment of the present invention.

FIG. 4 is a flowchart of the process by which an application may correct an error by operating both within and outside an OS environment, according to one embodiment of the invention. For the purposes of illustration, an example employing an anti-virus application has been chosen. However, embodiments of the present invention may be employed using any application requiring low level access to hardware level 201 outside the OS environment. A process according to one embodiment may include, without limitation, the operations of: generating a capsule file from within an operating system (OS) in a computing device, passing the capsule file to a firmware interface, exiting the OS, loading contents of the capsule file, and executing the contents of the capsule file. These operations may be performed automatically without user intervention In operation 401, an anti-virus or other security or integrity application may be executed on a system to conduct a virus scan. Based on the results of the scan in operation 401, the system may determine whether a problem such as a virus exists. If a virus or other problem does not exist, the system may report the results of the scan to the user in operation 410. However, if a virus is detected, the system may proceed to operation 403, in which specific information about the virus may be collected as well as the information necessary to repair the problem or remove the virus. This may include the type of virus, files infected, uninfected versions of the affected files, etc. The system may retrieve this information from local sources or from a network, such as an Internet site run by the anti-virus application vendor. In step 404, the system may construct a capsule or software module containing software and information necessary to remove the virus outside the OS environment. In one embodiment constructing the capsule file may also appending digital signature 505 to the capsule file. The structure of the capsule is discussed in greater detail in connection with FIGS. 5A and 5B.

In operation 405, the system may pass the capsule to firmware interface 203 by means of a function call within an OS environment. The transfer operation may include copying the capsule to a writable area in firmware 202, or by passing a reference to the location of the capsule stored in memory unit 102 or storage unit 103, or other methods.

As depicted in FIG. 4, operations 401-405 preferably occur within the OS environment. However, these operations need not all occur in the OS environment. For example, system firmware 202 may be configured to search for capsules upon initialization in pre-defined locations, obviating the need for operation 405 to occur within an OS environment. In either case, OS 204 exits and returns control of the system to firmware 202 and firmware interface 203 by either unloading itself from memory, or preferably by simply rebooting the system.

In operation 406, firmware 202 and firmware interface 203 may unpack and/or execute the capsule generated in operation 404 and load applications 307 and drivers 308 contained within, during operation 302 of the booting sequence. In one embodiment, this operation may include verifying digital signature 505 appended to the capsule file. In operation 407, applications 307 and drivers 308 may be executed to complete the task which was not completed in the OS environment, such as scanning for and recovering from a virus. The system need not repeat the task started in the OS environment in its entirety, but may employ information contained in the capsule to do so. The system may then indicate the results of operation 407 by storing a status or error code in a file or table that is accessible to OS 204, as shown in operation 408. The system may then complete the booting process into the OS environment by executing steps 303-305 in FIG. 3, as discussed herein.

In operation 409, once OS 204 has resumed control of the system, the application (for example the anti-virus application) may retrieve the status code stored in operation 408. The application may then display the results of the operations performed both within and outside the OS environment to the user, as shown in operation 410.

In one embodiment, operations 401-410 are performed automatically, without user intervention, in order to provide the greatest utility and usability to the user.

While some operations and systems herein are described with reference to checking for a virus, embodiments may operate on entities other than a virus, or not called a virus, such as a "worm" or other undesirable software.

Other operations or series or operations may be used.

Figures 5A, 5B:
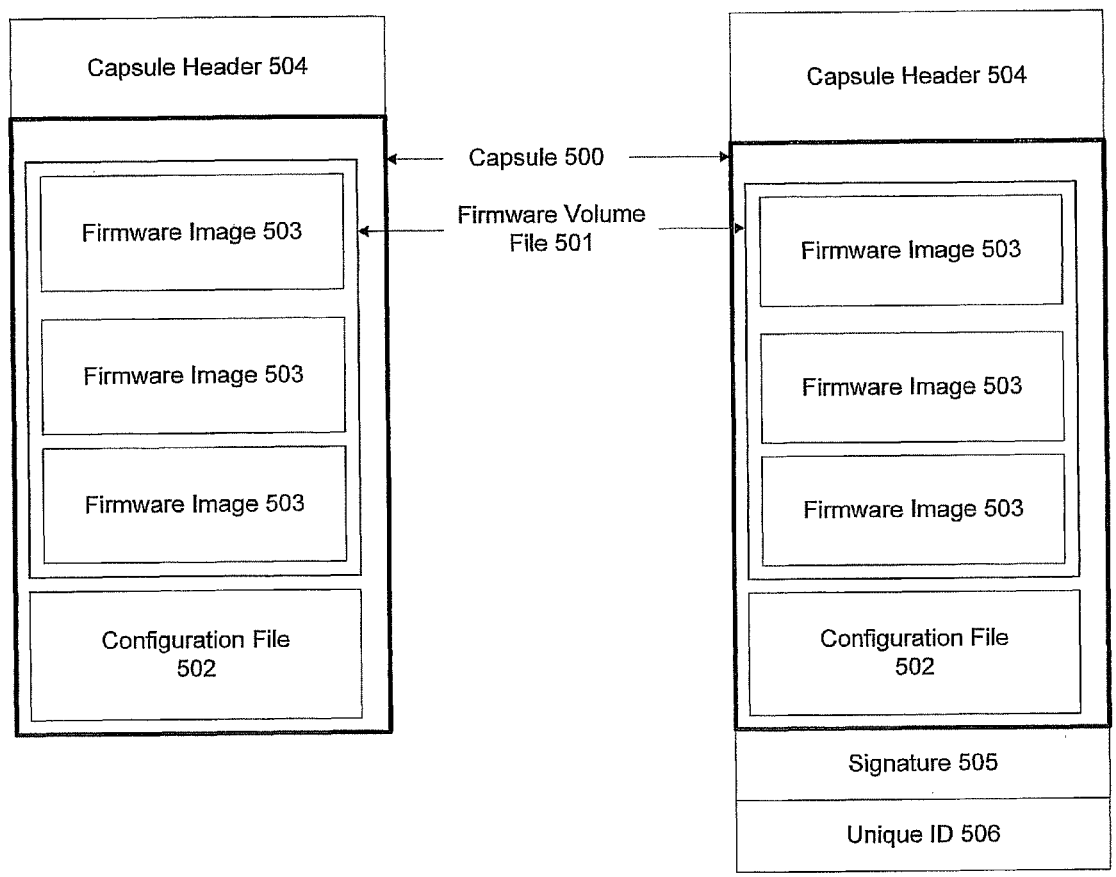
FIGS. 5A and 5B illustrate structures of an unsigned and signed capsule file, respectively, according to one embodiment of the present invention.

FIGS. 5A and 5B depict an unsigned and signed capsule file, respectively, according to one embodiment of the invention. It is to be understood by one skilled in the computer arts that FIGS. 5A and 5B represent two possible arrangements of data within a capsule; other capsule file configurations are possible and within the scope of embodiments of the present invention. For example, capsule formats specified by the UEFI may also be used by embodiments of the present invention. In FIG. 5A, capsule 500 is comprised of firmware volume 501 and one of more configuration files 502. Firmware volume 501 may contain at least one of firmware image 503, which may include applications capable of functioning outside an OS environment 307, drivers capable of functioning outside an OS environment 308, and firmware updates to various components of firmware 202. Firmware images 503 may be supplied by OS 204, the application itself (e.g. anti-virus, disk management utility, etc.), or may be downloaded from an external source over a network. Downloading firmware images over a network may ensure that the most up to date images are used. Common firmware images may include such drivers as network and file system drivers necessary to access files from internal or external sources. Configuration file 502 may contain the values for various parameters and settings used by firmware interface 203 during the unpacking and execution of capsule 500. These settings may be generated by an application running in the OS environment and may be preferably expressed in a standard syntax such as HyperText Markup Language (HTML) or Extensible Markup Language (XML). However, any format compatible with firmware interface 203 may be used. The contents of capsule 500 may be arranged, or "packed", in a specified format within capsule 500. The packing operation may include a file compression operation, or may be encrypted, as discussed in connection with FIG. 5B. However, if the contents of capsule 500 contain only one file, no such packing operation may be necessary.

Capsule header 504 may be appended to capsule 500, but is not part of the capsule itself. Rather, capsule header 504 may contain a description of the capsule file generated by an application running in the OS environment. This description may include such metadata as capsule size, capsule contents, capsule identification (ID) number, and various other metadata attributes.

FIG. 5B shows a secure version of the capsule file of 5A, in an alternate embodiment of the present invention. The variant depicted in FIG. 5B may contain all the elements depicted in FIG. 5A but additionally may include for example signature 505 and unique ID 506 appended to capsule 500. Signature 505 may use encryption and/or digital signature techniques to verify the integrity and authenticity of the contents of capsule 500. This may be performed as an additional step in operation 404 of FIG. 4, in which the capsule file is created. Preferably, the security mechanism may employ digital certificates issued by an external source which may only be accessible over a network. Digital signature 505 appended to the capsule file may then be verified in operation 406 of FIG. 4, before capsule 500 is unpacked and its contents loaded. Optionally, the capsule may also be associated with unique ID 506 for use with the encryption or digital signature mechanism.

Other or different components may be used within a capsule or software module constructed or used with embodiments of the invention.

Embodiments of the present invention have been described with certain degree of particularity. Those versed in the art will readily appreciate that various modifications and alterations may be carried out without departing from the scope of the following claims:

The invention claimed is:

1. A method comprising:
generating a capsule file from within an operating system (OS) in a computing device in response to detecting a virus;
passing the capsule file to a firmware interface, the capsule file being tailored to include repair information associated with the detected virus;

executing the contents of the capsule file via the firmware interface to perform a repair based on the repair information in response to exiting the OS; and booting the OS after receiving a virus repair status from the firmware interface.

2. The method of claim 1, wherein the capsule file is generated by an application program executing in an OS environment.

3. The method of claim 2, wherein the application program comprises at least one of an anti-virus utility, a disk defragmentation utility, an undelete utility, a data recovery utility, a hardware diagnostic utility, or a hardware diagnostic and repair utility.

4. The method of claim 1, wherein the capsule file comprises:

a firmware update;
a driver to function outside an OS environment; and
an application to function outside the OS environment.

5. The method of claim 1, wherein the OS is exited by rebooting.

6. A system comprising:

a processor;
a memory;
a Basic Input Output System,
an operating system (OS); and
a firmware interface, wherein the processor is to:

generate a capsule file from within the OS in a computing device in response to detecting a virus;

pass the capsule file to the firmware interface, the capsule file including repair information associated with the detected virus;

upon exiting the OS, execute the contents of the capsule file via the firmware interface to implement a repair based on the repair information; and boot the OS in response to receiving a virus repair status from the firmware interface.

7. The system of claim 6, wherein the capsule file is to be generated by an application program executing in the OS.

8. The system of claim 7, wherein the application program comprises at least one of an anti-virus utility, a disk defragmentation utility, an undelete utility, a data recovery utility, a hardware diagnostic utility, or a hardware diagnostic and repair utility.

9. The system of claim 6, wherein the capsule file comprises:

a firmware update;
a driver to function outside the OS; and
an application to function outside the OS.

10. The system of claim 6, wherein the OS is to be exited by rebooting.

11. A machine readable storage device or storage disk comprising instructions stored thereon that, when executed, cause a machine to, at least:

generate a capsule file from within an operating system (OS) environment in a computing device in response to detecting a virus;

pass the capsule file to a firmware interface, the capsule file having repair information associated with the detected virus;

upon shutdown of the OS, execute the contents of the capsule file via the firmware interface to perform a repair based on the repair information; and boot the OS after receiving a virus repair status from the firmware interface.

12. The machine readable storage device or storage disk of claim 11, wherein the instructions, when executed, cause a machine to generate the capsule file with an application program executing in the OS environment.

13. The machine readable storage device or storage disk of claim 12, wherein the application program comprises at least one of an anti-virus utility, a disk defragmentation utility, an undelete utility, a data recovery utility, a hardware diagnostic utility, or a hardware diagnostic and repair utility.

14. The machine readable storage device or storage disk of claim 11, wherein the instructions, when executed, cause the machine to load the capsule file with firmware updates, drivers capable of functioning outside the OS environment, and applications capable of functioning outside the OS environment.

15. The machine readable storage device or storage disk of claim 11, wherein the instructions, when executed, cause the machine to exit the OS by rebooting.

* * * * *